US008483293B2

(12) United States Patent
Wilhelmsson et al.

(10) Patent No.: US 8,483,293 B2
(45) Date of Patent: Jul. 9, 2013

(54) METHOD AND DEVICE FOR SIGNAL PROCESSING

(75) Inventors: Leif Wilhelmsson, Dalby (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 990 days.

(21) Appl. No.: 12/096,607

(22) PCT Filed: Dec. 13, 2006

(86) PCT No.: PCT/EP2006/069677
§ 371 (c)(1),
(2), (4) Date: Jun. 8, 2008

(87) PCT Pub. No.: WO2007/068724
PCT Pub. Date: Jun. 21, 2007

(65) Prior Publication Data
US 2008/0292036 A1    Nov. 27, 2008

Related U.S. Application Data

(60) Provisional application No. 60/750,570, filed on Dec. 15, 2005.

(30) Foreign Application Priority Data

Dec. 14, 2005  (EP) ..................................... 05112116

(51) Int. Cl.
*H04K 1/10* (2006.01)
(52) U.S. Cl.
USPC ........... 375/260; 375/267; 375/284; 375/285; 375/346; 375/348; 375/349

(58) Field of Classification Search
USPC ................. 375/260, 284, 285, 346, 348, 349, 375/267
See application file for complete search history.

(56) References Cited

U.S. PATENT DOCUMENTS

| 2003/0231725 | A1* | 12/2003 | Scarpa ........................... 375/350 |
| 2004/0224657 | A1* | 11/2004 | Matsusaka ................. 455/278.1 |
| 2004/0228272 | A1* | 11/2004 | Hasegawa et al. ............ 370/210 |
| 2006/0239178 | A1* | 10/2006 | Svensson et al. ............. 370/208 |

FOREIGN PATENT DOCUMENTS

| EP | 1237340 A | 9/2002 |
| WO | 2004/086706 A | 10/2004 |

OTHER PUBLICATIONS

EPO, Int'l Search Report in PCT/EP2006/069677, Nov. 4, 2007.
Locatelli et al, An Optimized Digital RFI Cancellation Scheme for DMT-based VDSL Systems, Proc. 8th Int'l Conf. on Communication Systems, Nov. 25, 2002, pp. 229-233, vol. 1, IEEE, Abstract.

* cited by examiner

*Primary Examiner* — Kabir A Timory
(74) *Attorney, Agent, or Firm* — Potomac Patent Group PLLC

(57) ABSTRACT

A device (100, 200) and a method is provided for processing a signal. The device comprises a filter unit 5 (101, 201); an FFI unit (102, 202) operatively connected to the filter unit and being located after the filter unit along a signal path for the signal; and a compensation unit (103, 203) operatively connected to the FFI unit and being located after the FFT unit in the signal path. The compensation unit is adapted to compensate for attenuation of the signal, which has been caused by the filter unit.

9 Claims, 2 Drawing Sheets

METHOD AND DEVICE FOR SIGNAL PROCESSING

TECHNICAL FIELD OF THE INVENTION

The present invention relates to a device, a method, and a computer program product for processing a signal.

Description of Related Art

OFDM (Orthogonal Frequency Division Multiplex) is a multiple carrier access technique for high-rate wireless applications. It is used in different versions of WLAN, such as 802.11a and g, and different standards for broadcasting, like DVB-T (Digital Video Broadcast—Terrestrial), DVB-H (DVB Handheld), and DAB (Digital Audio Broadcast). One advantage of using OFDM compared to other techniques is obtained when the channel is highly frequency selective because the channel equalization can be done at low complexity. For single carrier techniques, a highly frequency selective channel normally implies that a very complex channel equalizer is needed in order to get reliable communications. For OFDM, the equalization is easily done in the frequency domain by essentially multiplying with the inverse of the (estimated) channel.

In receivers, some kind of filtering is used to filter out the desired signal and at the same time attenuate adjacent channels. This kind of filtering is often referred to as channel filtering. The channel filter is usually chosen so that the desired signal is not distorted. Therefore, the effect of the channel filter can normally be neglected. Sometimes the channel filter has the same characteristics as the pulse-shaping filter in the transmitter. This is referred to as a matched filter, and is optimum as far as noise is concerned. In some situations, however, the channel filter in the receiver is not designed primarily for obtaining the best possible noise performance. Instead, the channel filter is designed based on a trade-off between noise performance and the ability to filter out interference from adjacent channels.

This trade-off usually means that the implemented channel filter is narrower than would have been the case if optimum noise performance had been targeted. The reason of course being that a narrower channel filter will attenuate an adjacent interferer more. In single carrier systems, what usually limits how narrow the channel filter can be made is how much the desired signal can be distorted. If the channel filter is too narrow, it will cause a considerable amount of inter-symbol interference (ISI). Since the ISI must be equalized, a too narrow filter means that a very complex equalizer is required unless the noise performance should be completely ruined.

In some of the situations where OFDM is employed, it is desired to filter out a very strong interfering signal, which is located very closely to the OFDM signal. This means that filtering out the interfering signal becomes critical in order to get acceptable performance for the OFDM system. However, since this kind of filtering has a similar effect as a multi-path channel in that it must be equalized not to ruin the performance, using a very narrow filter might not be feasible since that may exceed what can be equalized in case the experienced channel is very time-dispersive, i.e., has a large delay spread.

Specifically, in an OFDM system a guard interval (GI), sometimes also referred to as a cyclic prefix, is used to handle a time-dispersive channel. If the excess delay of the channel is smaller than the duration of the GI, the inter-symbol interference (ISI) may be avoided.

The duration of the GI must be at least as large as the maximum excess delay that can be expected to be experienced by the system. This means that most of the time the GI is larger than what actually is needed. In case there is only one transmitter and one receiver involved in the communications, it is easy to envision that it in principle would be possible to measure the delay spread of the channel and then in an adaptive fashion change the GI so that it is large enough but not larger. However, in case the communications is to many users, this is not a feasible approach. One such situation is in case the system is used for broadcast, like DVB-T and DVB-H. For such a system, the same signal is intended for several users that typically will experience very different channel conditions. Since the GI must be chosen large enough so that it exceeds the delay spread experienced by (almost) all users, it means that almost all receivers will effectively have a GI that is larger than what is actually needed. Another situation where the receivers very likely will experience a situation where the GI is larger than actually needed is in case of multiple access. Specifically, in case OFDM is used for transmission of information from a base station to a terminal and the available carriers are dedicated to several users, the GI for the transmitted signal must be chosen based on the user having the channel with the largest delay spread. Again, the situation where most of the receivers in fact have a GI, which is larger than actually needed, is faced.

One problem with the existing solution is that it does not allow for an OFDM system to co-exist with a strong interferer at a channel, which is adjacent to a channel of the OFDM system. This is a particular problem in case an OFDM based system is to be introduced and is expected to co-exist with another system, e.g., GSM (Global System for Mobile communications). It might also be a problem for the DVB-H standard, since this initially is expected to co-exist with analog TV transmission. Since the received analog signal might be relatively strong, a substantial filtering of this signal is required for DVB-H reception to be possible. The fundamental reason for the problem is that a strong interfering signal will result in an unacceptable high level of FFT (Fast Fourier Transform) leakage, something that is extremely complex or even impossible to counteract after the FFT.

Another problem, although somewhat related, is experienced in case a receiver, which supports several bandwidths that are only differing by a relatively small amount, should be implemented. Especially in case the channel filters are to be implemented in the analog domain, this means that several analog filters are required, which in turn means increased cost.

SUMMARY OF THE INVENTION

According to a first embodiment, a device for processing a signal comprises a filter unit; an FFT unit operatively connected to the filter unit and being located after the filter unit along a signal path for the signal; and a compensation unit operatively connected to the FFT unit and being located after the FFT unit in the signal path. The compensation unit is adapted to compensate for attenuation of the signal, which has been caused by the filter unit.

The device may comprise a channel estimation unit and an equalizer, which are operatively connected to the compensation unit. The compensation unit may be located prior to the channel estimation unit and the equalizer along the signal path.

The compensation unit may be adapted to apply to the signal a compensation function, which is the inverse of the filter response of the filter unit.

The device may comprise a controller adapted to control the filter unit, which may be a controllable filter unit having at least one controllable filter parameter.

The device may comprise a delay spread estimation unit adapted to determine the delay spread of the signal. The controller may be adapted to control the filter unit and the compensation unit in dependence of the determined delay spread.

The device may comprise an interference estimation unit, which may be adapted to determine an interference level between the signal and an interfering signal. The controller may be adapted to control the filter unit and the compensation unit in dependence of the determined interference level.

According to a second embodiment, a method for processing a signal, comprises filtering a received signal; FFT processing the signal after said filtering; and compensating the signal for attenuation, which has been caused by the filtering, after said FFT processing.

The method may comprise channel estimating and equalization of the signal after said compensating.

The compensating may comprise applying a compensation function, which is the inverse of the filter response for said filtering, to the signal.

The method may comprise controlling at least one controllable filter parameter of a filter unit used for said filtering.

The method may comprise determining the delay spread of the received signal, and controlling the filter unit and a compensation unit used for said compensating in dependence of the determined delay spread.

The method may comprise determining an interference level between the received signal and an interfering signal, and controlling the filter unit and a compensation unit used for said compensating in dependence of the determined interference level.

According to a third embodiment, a computer program product comprises computer program code means for executing the method for processing a signal, when said computer program code means are run by an electronic device having computer capabilities.

According to a fourth embodiment, a computer readable medium has stored thereon a computer program product comprising computer program code means for executing the method for processing a signal, when said computer program code means are run by an electronic device having computer capabilities.

Further embodiments of the invention are defined in the dependent claims.

Some embodiments of the invention provides for a device and method for processing a signal.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of the invention, reference being made to the accompanying drawings, in which.

DETAILED DESCRIPTION OF EMBODIMENTS

Figure 1:
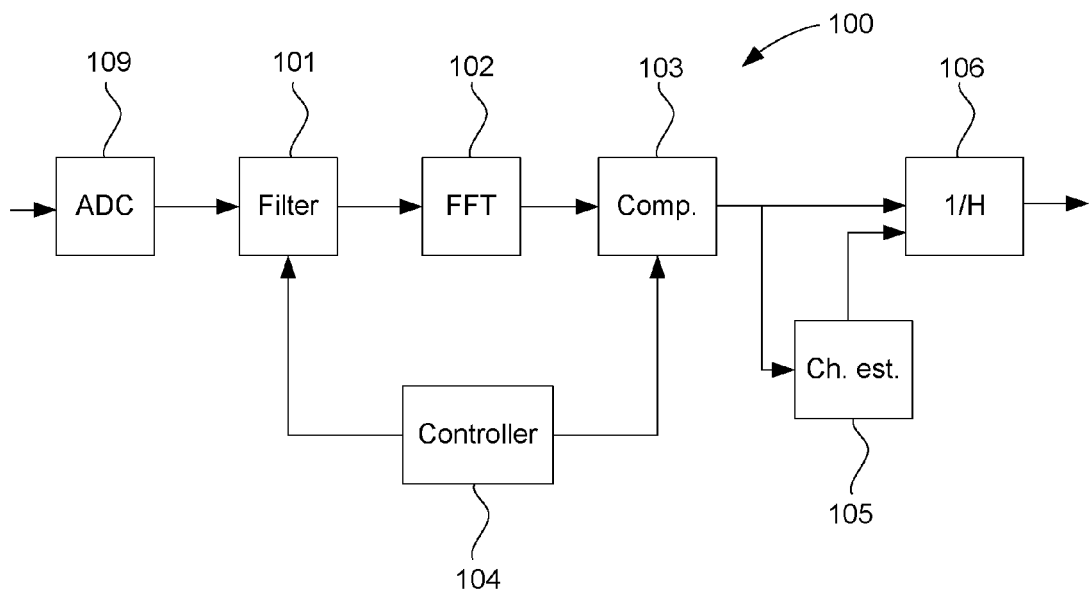
FIG. 1 is a circuit diagram of an embodiment of a device for processing a signal.

FIG. 1 illustrates an embodiment of a device 100 for processing a signal. The device 100 may form part of a receiver, such as an OFDM receiver. The device 100 comprises a filter unit 101, an FFT unit 102, and a compensation unit 103. The device 100 may also comprise a controller 104, a channel estimation unit 105, an equalizer 106 and an analog to digital converter (ADC). The FFT unit 102 is located after the filter unit 101 in a signal path of the device 100. The compensation unit 103 is located after the FFT unit 102 in the signal path. The compensation unit is located prior to the channel estimation unit 105, and the equalizer 106 in the signal path.

An input signal to the device 100 may comprise a desired signal and an interfering signal. The interfering signal may be a signal from a channel, which is adjacent to a channel of the desired signal. The interfering signal may be located within the bandwidth of the desired signal. Alternatively, the interfering signal may be located adjacent to the bandwidth of the desired signal.

The desired signal comprises a plurality of carriers. Furthermore, the desired signal may include a frequency range, in which no carriers are located or in which carriers are disabled. In this frequency range, other systems, such as a GSM system, may transmit signals. Alternatively, other systems are transmitting signals closely to the ends of the bandwidth for the desired signal. Signals transmitted by other systems may be interfering signals.

The filter unit 101 is configured to filter out the interfering signal of the input signal to the device 100. Thus, FFT leakage in the FFT unit 102 will be reduced. The FFT unit 102 is adapted to FFT process the signal output from the filter unit 101. The compensation unit 103 is adapted to compensate for any attenuation of the desired signal caused by the filter unit 101. For example, if the filter unit 101 attenuates any carriers of the desired signal, the attenuation will be compensated for. Thus, the desired signal after the compensation unit 103 will be substantially unaffected by the filtering in the filter unit 101. Furthermore, any processing after the compensation unit 103, such as channel estimation and/or equalization will be unaffected by the filtering in the filter unit 101. The filter unit 101 may have a channel filter characteristic for filtering out the interferer and forward the desired signal.

In the embodiment of FIG. 1, the filter unit 101 has a fixed filter characteristic. A fixed filter characteristic may e.g. be used if the device 100 is employed to support a system communicating signals with several similar bandwidths, e.g. 5, 6, 7, or 8 MHz. The filter unit 101 may be fixed to match the smallest of the supported bandwidths and to filter out adjacent interference. In case a bandwidth, which is larger than supported by the filter unit 101, actually is used, the filter unit 101 will attenuate outer carriers of the desired signal. The attenuation of the outer carriers of the desired signal is compensated for by the compensation unit 103 after the FFT processing by the FFT unit 102. What limits the range of bandwidths that can be supported in this way is basically that the carriers that are attenuated will have fewer bits of resolution. Thus, there is a practical limit for how large range of bandwidths that can be handled. If the filter unit 101 comprises a single fixed filter, the filter unit 101 need not be controlled.

In another embodiment, the filter unit 101 includes a plurality of fixed filters, or is adaptable to provide any of a plurality of filter characteristics. Each filter characteristic may be adapted to support a specific bandwidth e.g. 5, 6, 7, or 8 MHz, of the desired signal. Then, the filter characteristic of the filter unit 101 may be set in dependence of the bandwidth of the desired signal.

Figure 2:
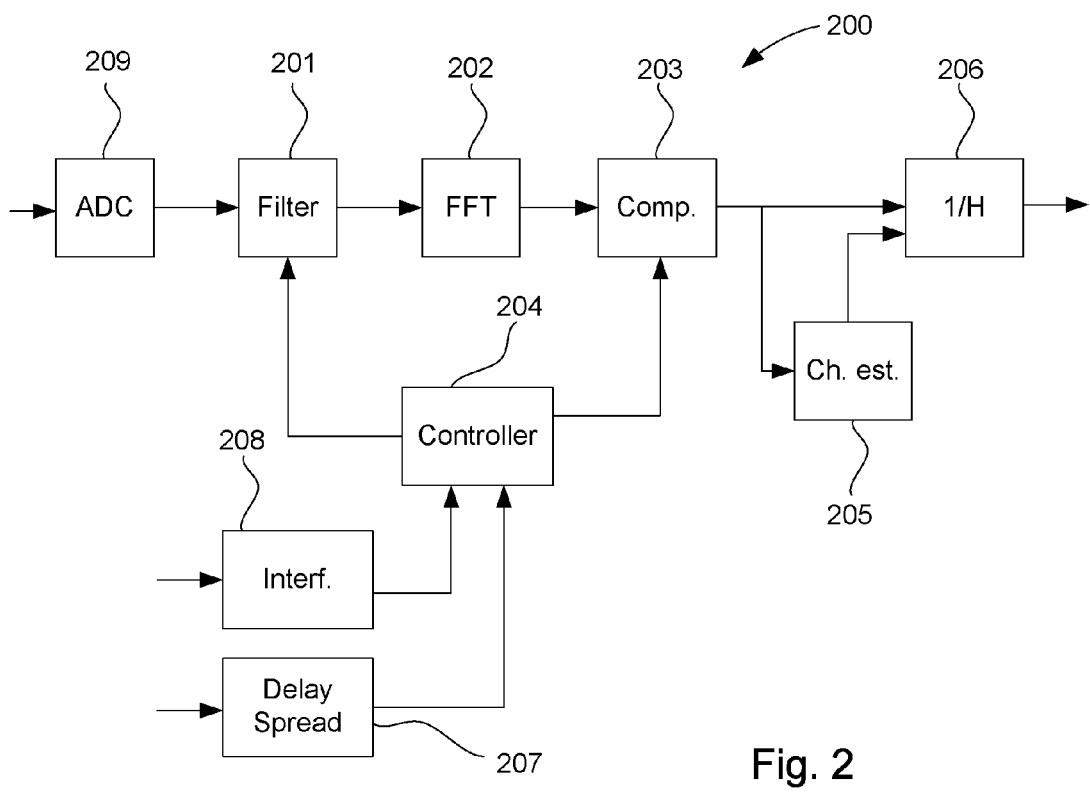
FIG. 2 is a circuit diagram of an embodiment of a device for processing a signal.

FIG. 2 illustrates another embodiment of the device 200 for processing a signal. The device 200 comprises a filter unit 201, an FFT unit 202, and a compensation unit 203. The device 200 of the embodiment of FIG. 2 also comprises a controller 204, a channel estimation unit 205, an equalizer 206, a delay spread estimation unit 207, an interference estimation unit 208, and an ADC 209. The delay spread estimation unit 207 is adapted to determine the delay spread of the signal. The interference estimation unit 208 is adapted to determine interference between the desired signal and the interfering signal. Filter unit 201 is a controllable filter unit. Furthermore, compensation unit 203 is controllable. The filter unit 201 and the compensation unit 203 are controllable by the controller 204. The controller 204 may be adapted to control any of the filter unit 201 and the compensation unit 203 in dependence of at least one of delay spread determined by the delay spread estimation unit 207 and interference determined by the interference estimation unit 208. Units in FIG. 2, which have similar reference numerals as units of FIG. 1, have the same or similar function. For example, FFT unit 101 and FFT unit 201 have the same function.

One situation where a controllable filter unit may be useful is when a multiple carrier system, such as an OFDM system, is intended to co-exist with another system, such as GSM, which uses an adjacent frequency band. The adjacent frequency band may be located within or close to the frequency band of the OFDM system. In that situation, it may be desired to use a narrow channel filter, as described above. Using a controllable filter, at least one controllable filter parameter of the filter unit 201 may be set in dependence of signals transmitted in the other system. The controller 204 may first determine if the other system is active. If the other system is active, attenuation of interfering signals may be prioritized, e.g. over noise performance. If it is not active, there is no need to set a narrow filter characteristic of the filter unit 201. Instead a wide filter characteristic of the filter unit 201 may be set, whereby noise performance is prioritized, e.g. over attenuation of interfering signals. Here, the notation SNR (Signal to Noise Ratio) will be used even if the disturbance is due to interference rather than noise. The determination if the other system is active may be made by determining the interference level of the desired signal, or from signaling from the other system. The interference level may be determined by the interference estimation unit 208. The interference level may e.g. be determined by determining an SNR value of the signal input to the device 200. The SNR value may be compared to predetermined SNR values stored in a memory (not shown). Each stored SNR value may correspond to interference signals of different strengths. Alternatively, the power level of the interfering signal is determined. The power level of the interfering signal may e.g. be estimated by the interference estimation unit 208. The stronger power level, the stronger interferer. Alternatively, the interference level may be estimated by using an oversampled FFT (i.e. higher bandwidth of the FFT than the desired signal) and measure the desired signal to adjacent channel power ratio. A low signal to adjacent channel power ratio indicates a large interference level from the adjacent channel, and vice versa. The power level of the interfering signal may e.g. be determined during times when the desired signal is not present. Then, it may be assumed that the interference level remains substantially unchanged also when the desired signal becomes present.

The filter parameters of the filter unit 201 may be set in dependence of the detected interference level. The weaker interferer, the more relaxed filter characteristic of the filter unit 201 may be used.

Furthermore, if an interferer is detected, the delay spread of the channel for the desired signal is determined and compared to the duration of the GI. If the delay spread is large compared to the duration of the GI, e.g. if the delay spread is substantially as large as the GI, the filtering is done with a filter characteristic of the filter unit 201 that is relatively relaxed but where the cut-off frequency is chosen relatively small, such as considerably smaller than the bandwidth of the desired signal, e.g. 70%. This means that 30% of the outer carriers in the OFDM signal would be substantially attenuated. The actual values of the filter response and cut of frequency have to be tested and evaluated in each particular implementation. If the delay spread is small compared to the GI, e.g. less than 50% of the GI, on the other hand, this implies that a steeper filter can be used to filter out the interference, so that the cut-off frequency of the filter can be made larger than if the delay spread is larger. Consequently, the characteristic of the controllable filter may be adaptively set by setting the filter parameters appropriately.

A steeper filter (more complex) has a longer duration in time (delay spread) compared to a more relaxed (less complex) filter. The filter unit 201 adds delay spread to the delay spread caused by the transmission channel. The total delay spread, i.e. the delay spread caused by the filter unit 201 and the delay spread caused by the transmission channel, should not have a longer duration than the GI. The duration of the delay spread caused by the transmission channel is not fixed. Also, the delay spread caused by the transmission channel may be estimated. Thus, the complexity of the filter unit 201 may be controlled in dependence of the delay spread of the transmission channel. The complexity of the filter unit 201 may be controlled such that the delay spread of the transmission channel plus the delay spread of the filter unit 201 do not exceed the GI.

The delay spread estimation unit 207 may be adapted to estimate the delay spread. The delay spread may e.g. be estimated by IFFT (Inverse Fast Fourier Transform) processing the FFT processed signal output from the FFT unit 203. Thus, an estimate of the impulse response of the channel is obtained. Then, the delay spread may be obtained from the estimated impulse response. The delay spread is proportional to the length of the estimated impulse response. Alternatively, the received signal may be considered in the frequency domain directly. For example, the number of dips per MHz of the received signal may be counted. The number of dips per MHz is proportional to the delay spread. The closer the dips are together the longer delay spread.

The embodiment of FIG. 1 is based on the idea of compensating for attenuation of the desired signal caused by the filtering in the filter unit 101 within the signal bandwidth of the desired signal prior to the channel estimation. Assume that the filter response of the filter unit 101 is G(f). The filter compensation function $G_{comp}(f)$ to be applied by the compensation unit 103 is then defined as:

$$G_{comp}(f) = \begin{cases} \dfrac{1}{G(f)} & \text{if } |f| \leq \dfrac{BW}{2} \\ 1 & \text{if } |f| > \dfrac{BW}{2} \end{cases}$$

where BW is the bandwidth of the desired signal. Note that for |f|>BW/2, the compensation value is irrelevant since these frequency bins at the output signal of the FFT unit 102 will not be used in the further processing anyway. The compensation has been described as unity if |f|>BW/2 to indicate that in fact nothing is done to compensate, although any compensation would give the same performance. The controller 104 may control the compensation unit 103 to apply the appropriate compensation function in dependence of the bandwidth of the desired signal.

The filter (or filter banks) for implementing G(f) may be stored in a memory. The controller 104 may set G(f) for the filter unit 101. As G(f) is known, the inverse of the G(f) (or the filter bank of G(f)), i.e. $G_{comp}(f)$, within the passband of the desired signal could be derived and stored in a look-up table. Thus, the controller 104 may control the compensation unit 103 to apply $G_{comp}(f)$ by supplying values therefore e.g. in dependence of the present passband of the desired signal.

In the embodiment of FIG. 2, the delay spread of the signal to be processed by the device 200 may be determined, e.g. as described above. The interference level of the interfering signal may also be determined as described above. The interference level determined by the interference estimation unit 208 and the delay spread determined by the delay spread estimation unit 207 may be fed to controller 204. Controller 204 is adapted to choose, based on at least one of the interference level and the delay spread, a suitable filter characteristic for the filter unit 201. Also, controller 204 controls the filter unit 201 according to the determined filter characteristic, e.g. by setting filter taps of the filter unit 201 accordingly. Also, the controller 204 controls the compensation unit 203 to adapt its characteristic corresponding to the characteristic of the filter unit 201, e.g. by controlling the filter compensation taps. Filter selection could be based on a number of filters in a filter bank stored in a look up table. Each filter may be optimized for a certain delay spread and/or interference scenario, or could be derived "on the fly" based on delay spread and/or interference information. For example, if the interference level and or delay spread exceeds a certain threshold value, another filter may be chosen. Threshold values may be provided for each filter of the look up table.

The filter unit may be implemented in analog domain prior to the ADC 109, 209. Alternatively, the filtering may be done in the digital domain, i.e., after the ADC 109, 209. If the filter unit 101, 201 is implemented in the digital domain, all functions of the device 100, 200 may be implemented by a processor running software therefore. If the filter unit 101, 201 is implemented in the analog domain any function of the device 100, 200 provided after the ADC 109, 209 in the signal path may be implemented by a processor running software therefore.

Implementing the compensation unit 103, 203 after the FFT unit 102, 202 allows for a simple implementation, as it is implemented in the frequency domain.

Simulations of the invention have been made, which showed that embodiments of the invention provides superior filtering when adapting the filter unit 101, 201 to the current interference and delay spread scenario. In a simulation of the device according to FIG. 2, the simulation an OFDM signal with 192 used carriers transmitted over a 2.5 MHz bandwidth was assumed. The received OFDM signal power was −83 dBm, which gave an ideal SNR of 20 dB (over the thermal noise) when a noise factor of 7 dB in a front-end receiver was assumed. The filter sampling rate was 51.84 MHz and the guard interval was assumed to be 4.32 μSec, which corresponds to 224 samples at 51.84 MHz. Furthermore, an adjacent channel interferer (a GSM interferer) of −57 dBm at 1.5 MHz distance was also assumed. Two different delay spread scenarios was assumed, the first with a delay spread of 2.9 μSec, which gave the possibility to use a 75 taps digital filter, while the second case only had a delay spread of 77 nSec, which gave the possibility to use a 220 taps digital filter. The average Signal to Distortion Ratio (SDR) for all carriers and the SDR for the 10 outermost carriers were plotted as a function of the cut off frequency of the filter unit for both scenarios. The maximum SDR was achieved for different cut-off frequencies for the different scenarios. In the low delay spread scenario, a steeper (more taps) filter could be used, which made it possible to use a high cut-off frequency. Hence, in this case there was effectively only compensation of the attenuation of the outermost carriers that need to be done. In the large delay spread case however, a less steep filter was needed, which implied that the cut-off frequency needed to be reduced, and the filter compensation needed to affect more carriers. Also, the maximum achieved average SDR was lower in the large delay spread case (18 dB compared to 19.6 dB compared to 20 dB in the ideal (no ACI) case).

Hence, from the simulation example it can be confirmed that it can be an advantage to adapt the filter unit 201 to the current channel condition, e.g. in terms of interference of adjacent channel and delay spread.

Due to the possibility to equalize an OFDM signal without the needed for a very complex equalizer, it is possible to filter out adjacent interference without significantly increasing the complexity of the receiver. Thus, interference may be handled at very little extra cost.

Figure 3:
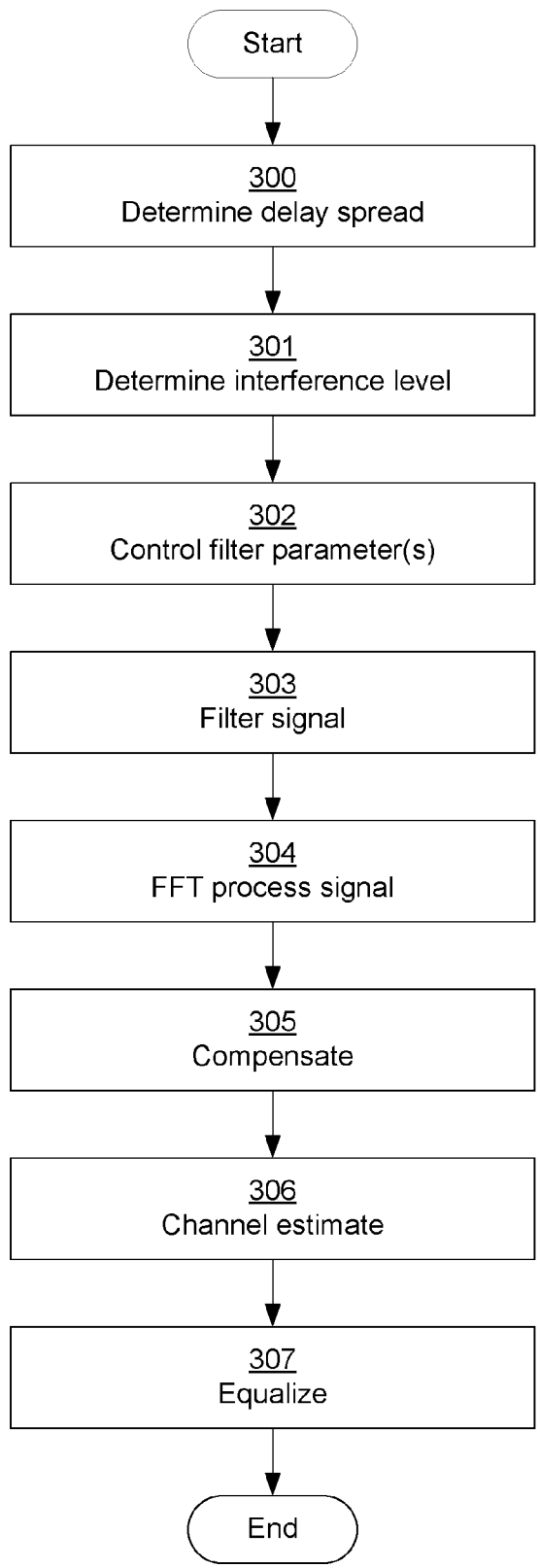
FIG. 3 is a flow-chart of a method for processing a signal.

FIG. 3 illustrates a method for processing a signal. In a first step 300, the delay spread of a signal is determined. In step 301, the interference ratio between the signal and an interfering signal is determined. Then, at least one of the filter parameters of the filter unit 302 is controlled in dependence of the determined delay spread and/or interference level. In step 303, the signal is filtered in the filter unit. FFT of the signal is performed in step 304 after the filtering. Then, the signal is compensated in step 305 for attenuation caused by the filtering. The compensation may be performed by applying the compensation function described above. Finally, channel estimation and equalization of the signal may be performed in steps 306 and 307 after the compensation.

All steps illustrated in FIG. 3 do not need to be carried out in all embodiments of the method according to the invention. For example, if the filter unit 101 does not need to be controlled, steps 300,301, and 302 can be omitted. Furthermore, steps 306 and 307 do not need to be carried out in all embodiments of the invention.

The device and method for processing a signal may be used in an OFDM receiver. The interfering signal may e.g. be a GSM signal. Alternatively, the OFDM receiver is used for digital broadcast, e.g., DVB-T or DVB-H and the interfering signal is due to an analog TV signal. The OFDM receiver may e.g. be adapted e.g. according to IEEE standard 802.11a or g.

As attenuation caused by the filter unit 101, 201 is compensated for after the FFT processing, a relatively narrow filter characteristic may be used. The usage of the processing device 100, 200 is further improved by adapting the filter unit 201 based on estimates of the delay spread of the channel as well as the interference level. By controlling the characteristic of filter unit 201 in dependence of the interferer, the noise performance of the filter unit 201 and its ability to filter out the interference may be controlled. Thus, if an interferer is not present or is weak, noise performance may be prioritized. If an interferer is present or strong, the ability to attenuate the interferer may be prioritized. Thus, the overall performance of the device 100, 200 will be increased.

In the figures, the equalizer 106, 206, and the channel estimation unit 105, 205 have been described. However, the equalizer and the channel estimation unit are not included in all embodiments of the invention. For example, if differential modulation is employed, such as in DAB, an equalizer and a channel estimation unit are not needed.

The invention may be embedded in a computer program product, which enables implementation of the method and functions described herein. The invention may be carried out when the computer program product is loaded an run in a system having computer capabilities. Computer program, software program, program product, or software, in the present context mean any expression, in any programming language, code or notation, of a set of instructions intended to cause a system having a processing capability to perform a particular function directly or after conversion to another language, code or notation.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A device for processing a signal received over a transmission channel of an orthogonal frequency division multiplexing system, comprising:
   a filter unit configured to filter out an interfering signal located outside a passband of a desired signal, the filter unit having at least one controllable filter parameter;
   a Fast Fourier Transform (FFT) unit operatively connected to the filter unit and located after the filter unit along a signal path for the signal;
   a compensation unit operatively connected to the FFT unit and located after the FFT unit in the signal path, wherein the compensation unit is adapted to apply to the signal a compensation function that compensates for a filter response of the filter unit within a signal bandwidth of the signal;
   a delay spread estimation unit adapted to determine a delay spread of the transmission channel; and
   a controller adapted to control the filter unit and the compensation unit based on the determined delay spread such that the delay spread of the transmission channel plus a delay spread of the filter unit does not exceed a guard interval of the signal.

2. The device of claim 1, further comprising a channel estimation unit and an equalizer, wherein the channel estimation unit and the equalizer are operatively connected to the compensation unit, and the compensation unit is located prior to the channel estimation unit and the equalizer along the signal path.

3. The device of claim 1, further comprising an interference estimation unit adapted to determine an interference level between the signal and an interfering signal, wherein the controller is adapted to control the filter unit and the compensation unit based on the determined interference level.

4. A method of processing a signal received over a transmission channel of an orthogonal frequency division multiplexing system, comprising:
   filtering the received signal, wherein an interfering signal located outside a passband of a desired signal is filtered out of the received signal and the filtering is based on at least one controllable filter parameter;
   Fast Fourier Transform (FFT) processing the filtered received signal;
   compensating, after the FFT processing, the filtered received signal for attenuation caused by the filtering by applying, to the signal, a compensation function that compensates for a filter response of the filtering within a signal bandwidth of the signal;
   determining a delay spread of the transmission channel; and
   controlling the at least one controllable filter parameter and the compensating based on the determined delay spread such that the delay spread of the transmission channel plus a delay spread of the filtering does not exceed a guard interval of the signal.

5. The method of claim 4, further comprising channel estimating and equalizing the signal after the compensating.

6. The method of claim 4, further comprising determining an interference level between the received signal and the interfering signal, and controlling the filtering and compensating based on the determined interference level.

7. A non-transitory computer-readable medium having stored thereon instructions that, when executed by the computer, cause the computer to perform a method of processing a signal received over a transmission channel of an orthogonal frequency division multiplexing system, wherein the method comprises:
   filtering the received signal, wherein an interfering signal located outside a passband of a desired signal is filtered out of the received signal and the filtering is based on at least one controllable filter parameter;
   Fast Fourier Transform (FFT) processing the filtered received signal;
   compensating, after the FFT processing, the filtered received signal for attenuation caused by the filtering by applying, to the signal, a compensation function that compensates for a filter response of the filtering within a signal bandwidth of the signal;
   determining a delay spread of the transmission channel; and
   controlling the at least one controllable filter parameter and the compensating based on the determined delay spread such that the delay spread of the transmission channel plus a delay spread of the filtering does not exceed a guard interval of the signal.

8. The non-transitory computer-readable medium of claim 7, wherein the method further comprises channel estimating and equalizing the signal after the compensating.

9. The non-transitory computer-readable medium of claim 7, wherein the method further comprises determining an interference level between the received signal and the interfering signal, and controlling the filtering and compensating based on the determined interference level.

* * * * *

UNITED STATES PATENT AND TRADEMARK OFFICE
CERTIFICATE OF CORRECTION

PATENT NO.       : 8,483,293 B2                                  Page 1 of 1
APPLICATION NO.  : 12/096607
DATED            : July 9, 2013
INVENTOR(S)      : Wilhelmsson et al.

It is certified that error appears in the above-identified patent and that said Letters Patent is hereby corrected as shown below:

On the Title Page, Item (57), under "ABSTRACT", in Column 2, Line 2, delete "filter unit 5 (101, 201);" and insert -- filter unit (101, 201); --, therefor.

On the Title Page, Item (57), under "ABSTRACT", in Column 2, Line 3, delete "FFI" and insert -- FFT --, therefor.

On the Title Page, Item (57), under "ABSTRACT", in Column 2, Line 6, delete "FFI" and insert -- FFT --, therefor.

In the Specification

In Column 2, Line 6, delete "to many" and insert -- too many --, therefor.

In Column 5, Line 17, delete "FFT unit 201" and insert -- FFT unit 202 --, therefor.

In Column 6, Line 34, delete "FFT unit 203." and insert -- FFT unit 202. --, therefor.

In Column 8, Line 67, delete "an run" and insert -- and run --, therefor.

Signed and Sealed this
Twenty-ninth Day of July, 2014

Michelle K. Lee
*Deputy Director of the United States Patent and Trademark Office*